United States Patent [19]
Sturdevant

[11] 3,917,394
[45] Nov. 4, 1975

[54] AUTOMATIC COMPONENT POSITIONING DEVICE FOR OPTICAL SYSTEM
[75] Inventor: Eugene J. Sturdevant, Wilmington, Del.
[73] Assignee: Display Enterprises, Inc., Rockland, Del.
[22] Filed: Oct. 9, 1973
[21] Appl. No.: 404,271

[52] U.S. Cl. .................. 353/101; 310/14; 352/140; 354/195
[51] Int. Cl.².. G03B 3/02; G03B 3/10; H02K 41/00
[58] Field of Search ....... 353/101; 352/140; 310/12, 310/13, 14; 354/195

[56] References Cited
UNITED STATES PATENTS

| | | | |
|---|---|---|---|
| 2,896,503 | 7/1959 | Smith | 352/140 |
| 3,466,125 | 9/1969 | Jordan et al. | 353/101 |
| 3,639,048 | 2/1972 | Heaney et al. | 353/101 |
| 3,650,615 | 3/1972 | Aoki et al. | 353/101 |

Primary Examiner—Richard E. Aegerter
Assistant Examiner—Steven L. Stephan
Attorney, Agent, or Firm—Connolly and Hutz

[57] ABSTRACT

An optical projection lens tube comprises the armature of a linear induction motor. The surrounding field coils are connected to a semiconductor bridge network, which drives the armature in either of two directions in response to a signal obtained from an error detector and connected through a servo amplifier to the field. The bridge network effectively utilizes triacs and the amplifier includes differential, invert and noninvert amplifier sections. The error detector is of the reflecting beam photo detector type, and it is mounted on the rear of the projection lens. When the error detector determines a deviation from the correct focal distance of the projection lens tube from the transparency, it energizes the field through the servo amplifier circuit to reposition the armature and lens tube and thus remove the signal being generated by the error detector.

17 Claims, 12 Drawing Figures

Switch Sequence
Forward: A,B,C,D,A,B....
Reverse: D,C,B,A,D,C...

AUTOMATIC COMPONENT POSITIONING DEVICE FOR OPTICAL SYSTEM

BACKGROUND OF THE INVENTION

The automatic focusing of optical devices is advantageous particularly in automated slide projectors. One such device is shown in U.S. Pat. No. 2,896,503, utilizing an electrical solenoid operating against a resilient element. This necessitates the continuous energization of the solenoid to maintain the lens in its required position, which creates heat, noise, hysteresis and wear problems. Movement of other optical components is required to perform various useful functions. An object of this invention is to provide an efficient automatic component positioning or focusing device which need not be energized continuously during operation of the optical apparatus with which it is associated.

SUMMARY

A component in an optical system is mounted on the armature of a linear electric motor which is surrounded by a field. The field is connected to a semi-conductor bridge network, which drives the armature in either of two directions in response to a signal obtained from a position detector and connected through a servo amplifier to the field. The bridge network may effectively utilize triacs and the amplifier may advantageously include differential, invert and non-invert amplifier sections. The position detector may be of the reflecting beam and photo detector type, mounted on the component. When the detector determines a deviation from a predetermined position of the component, it energizes the field through the servo amplifier circuit to reposition the armature and attached components and thus remove the signal being generated by the position detector. The component may be a projection lens, a mirror, etc. It may be stably repositioned or summed by introducing a suitable signal into the position detector.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which.

DESCRIPTION OF THE PREFERRED EMBODIMENTS

Figure 1:
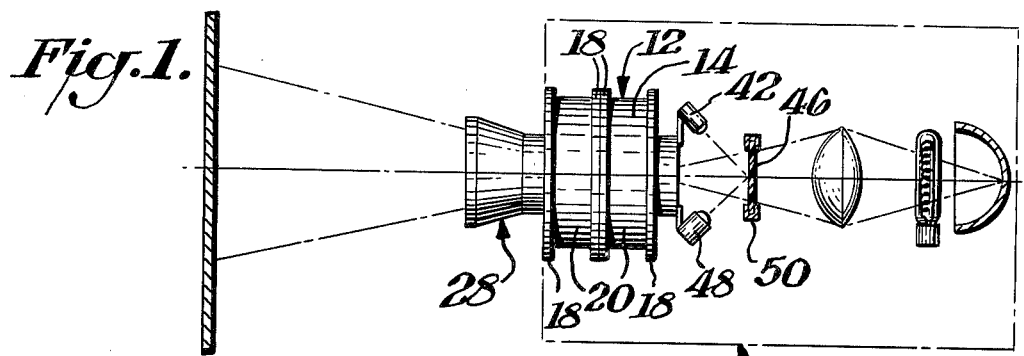
FIG. 1 is a partially schematic side view in elevation of one embodiment of this invention.
Figures 2, 3:
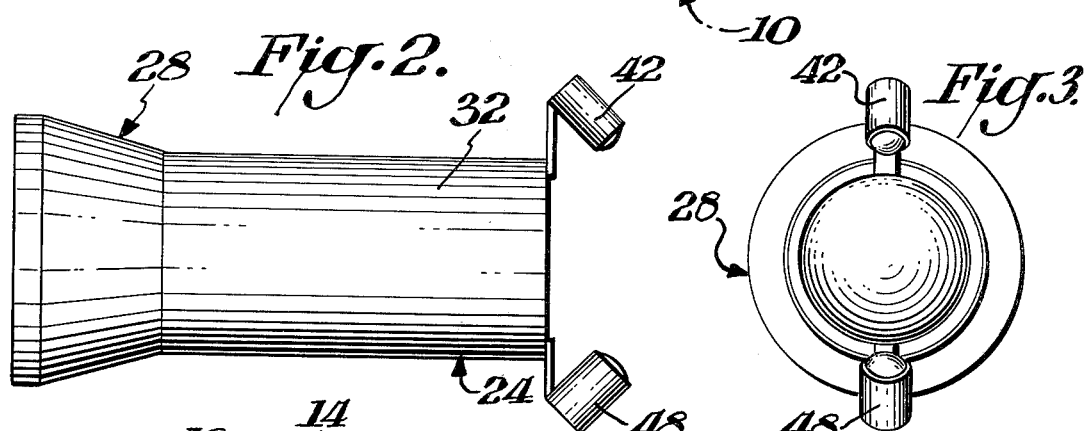
FIG. 2 is an enlarged side view in elevation of the lens tube armature portion of the embodiment of this invention shown in FIG. 1.
FIG. 3 is a righthand end view of the embodiment shown in FIG. 2.
Figures 4, 5:
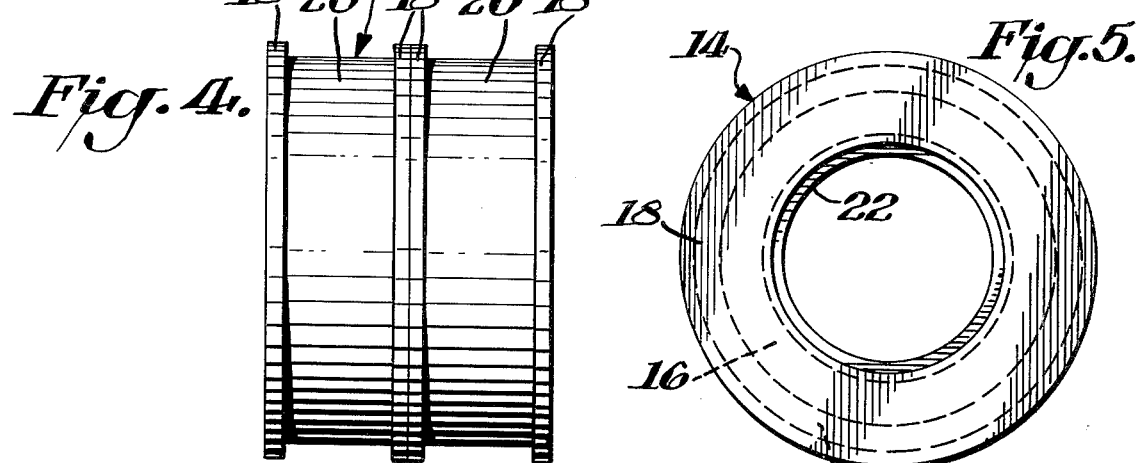
FIG. 4 is an enlarged side view in elevation of the field portion of the embodiment shown in FIG. 1.
FIG. 5 is an end view of the field portion shown in FIG. 4.
Figure 6:
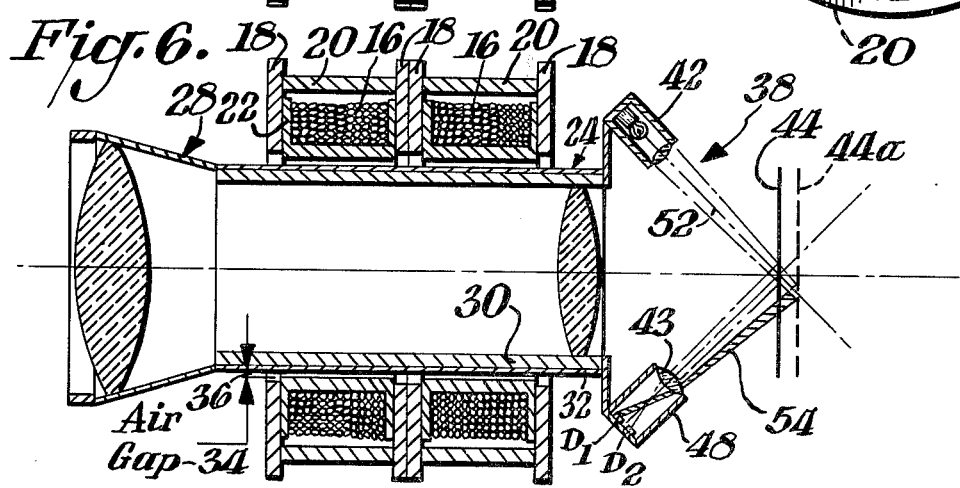
FIG. 6 is an enlarged cross-sectional view in elevation of principal portions of the embodiment shown in FIG. 1.

In FIGS. 1–10 is shown an automatic focusing system 10 including; a linear induction motor 12 having a fixed part or field 14, including, for example, two field coils 16, three pole pieces 18, and two yoke pieces 20 (field iron). The number of these parts is determined for a particular motor by the amount of force required, with juxtaposed coils operated out of AC phase with each other. Pole pieces 18 separate field coils 16 and form the end pieces for the motor field structure 14. Yoke pieces 20 serve as physical separators for pole pieces 18 and complete the ferromagnetic portion of the field's magnetic circuits. Field coils 16 are wound on bobbins 22 made of an insulating material, such as Delrin, the registered trademark of E. I. duPont de Nemours, Wilmington, Del. for a theroplastic acetate molding resin having high strength. ID of bobbins 22 is slightly smaller than the ID of pole pieces 18 in order that they serve as bearing surfaces for armature 24, centering armature 24 coaxially within the field structure 14, establishing part of the length of air gap 34 between pole pieces 18 and 24 armature, and acting as a dry "lubricant" for armature 24 to slide on.

Armature 24 is, for example, tubular in form and serves as part of the supporting "cell" for the elements of the projection lens 28. Armature 24 extends through the field structure 14, coaxially, and is partly made of a tube 30 of ferromagnetic material, such as steel. This steel part has on its outer surfaces a metallic shell or coating 32 of highly conductive metal, such as copper or aluminum. The conductive shell or coating 32 forms part of the air gap length between the armature steel and the steel pole pieces of the field structure. The total air gap 34 (shown in FIG. 6) thus consists of the conductive armature coating 32, the mechanical clearance 36 between the OD of the armature coating 32 and the ID of the field coil bobbins 22, and the ID difference between the coil bobbins 22 and the pole pieces 18 of the field structure 14. For best performance or maximum force on the armature per electrical watt applied to the field coils, the total air gap length is kept as small as is practical.

The operation of the AC linear induction motor 12 is easily explained by comparing with that of a polyphase AC rotary induction motor. The rotary machine differs from the linear machine primarily in structural geometry and in the requirement that stator (or field) poles always work in pairs, each pole pair being diametrically opposed and magnetically opposite in polarity. Thus, the rotary machine always has an even number of poles, in contrast with its linear counterpart which may have an even or an odd number of poles. The two are similar in that juxtaposed poles are energized inductively through their associated windings by AC electric currents that differ in electrical phase. This is accomplished by connecting the several windings to the different phases of a polyphase AC source or by shifting the phase of successive pole windings with respect to that of a single phase power source by interposing an appropriate capacitance in series with the windings so as to displace in time the varying electric currents, and hence their induced magnetic fields, uniformly around the periphery of the machine. By proper connection of the windings a sinusoidally distributed magnetic field in the air gap rotates around the machine at a uniform speed established by $$v = \frac{2\pi f}{p},$$

where $f$ is source frequency and $p$ is the number of pole pairs. This rotating magnetic field cutting the conductors of the squirrel cage armature induces a voltage giving rise to currents which flow in the armature in accordance with $e=Blv$ where $e$, the induced voltage on each conductor, results from B, the magnetic flux density cutting the armature conductors of length $l$, at a rate $v$, the velocity of the moving field. The currents so created in the armature from the induced voltages form their own magnetic fields. These fields coact with the traveling magnetic field generated by the field coils causing a force to be applied to the armature, $F=Bli$ that acts at the armature's radius.

$B$ = flux density due to field
$l$ = length of armature conductors
$i$ = current flowing in armature conductors.

Since the armature is restrained from free movement by its shaft and supporting bearings, the force is transformed into a torque $T=Blri$ and the armature therefore rotates on its axis, being dragged along by the rotating magnetic field. The squirrel cage armature structure can be replaced by a cylindrical conductive sheet as in the well known "Faraday cup-motor", but it still works on the same principle.

If the rotating machine is now imagined to be split open along its length parallel to its shaft axis and laid out flat, the previously rotating magnetic field now travels in linear fashion along the surface of the field structure, and the armature, similarly rolled out flat, is now dragged along by this moving field to the end of the machine. Since the physical continuity of the field no longer exists (that is, the field structure does not now close on itself) one can add more and more poles to the field structure making a "track" of the linearized machine as "long" as one wishes. If the field structure is lengthened without corresponding change in the armature length, at any one instant in time as the armature is dragged by the field, it continues to coact with the same number of field poles. The armature structure also might have been lengthened while the field was maintained in the same configuration as it was just after it was rolled out flat. While moving, the armature is therefore still coacting with the same number of field poles as before, which demonstrates such changes do not drastically affect the performance of the resulting machine. Now, if the flattened machine is bent around a new axis, parallel to its linear direction of travel, wherein the armature becomes a tube coaxial to this new axis and the field structure becomes also tubular in shape, coaxially surrounding the armature tube, the linear induction motor is geometrically reformed into a tubular shaped linear induction motor which is the preferred embodiment of this invention shown in FIGS. 1–6.

Just as the variable-reluctance principle can be applied for continuous rotation of an AC-reluctance machine, so also can this principle be made to serve in its linearized counterpart. The essential feature is that the magnetic circuit be of such a form that its reluctance depends on the relative position of its stationary and moving parts. The arrangement wherein the armature iron is slotted to provide different diameters along its length may be easiest to visualize. Different air gap lengths occur under the field pole pieces as the armature moves through the field. Such a machine will perform as an AC motor if the reluctance is a periodic function of the armature position.

Several configurations of the linear motor that permit it to function as a stepping motor provide alternative embodiments of this invention. For example, by slotting the armature again as in the case for the AC variable reluctance linear motor, but by driving the field coils selectively with DC currents, the armature will be made to step with each successive switching, aligning itself with the pole pieces in a manner that presents the least reluctance to the magnetic circuits. If the armature, instead of being slotted, is made of permanent ring magnets, stacked so as to present alternating, discrete north and south poles along its length, and the field is energized by selectively switching DC currents of proper polarity into the appropriate coils, a permanent magnet linear stepping motor will result, the counterpart of the well known rotary PM stepping motor.

In addition to its other advantages, the linear stepping motor configurations offer compatability to direct digital control, and discrete positioning such as might be desired in an optical system where discrete changes in focal length or magnifying power are required. Stepping motors may also be operated by "open-loop" servo control.

Figure 7:
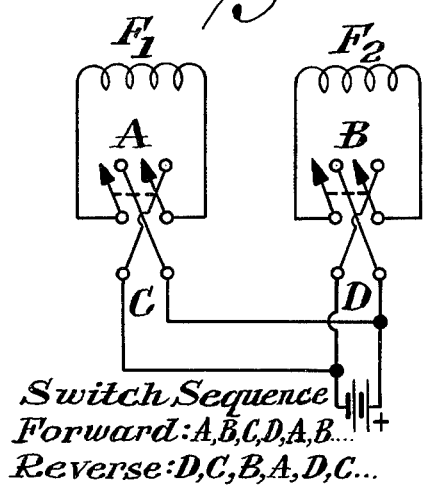
FIG. 7 is a schematic electrical diagrammatic view of the field windings and switching arrangement for a stepping motor embodiment utilizing armature such as shown in FIG. 11 and 12.
Figure 8:
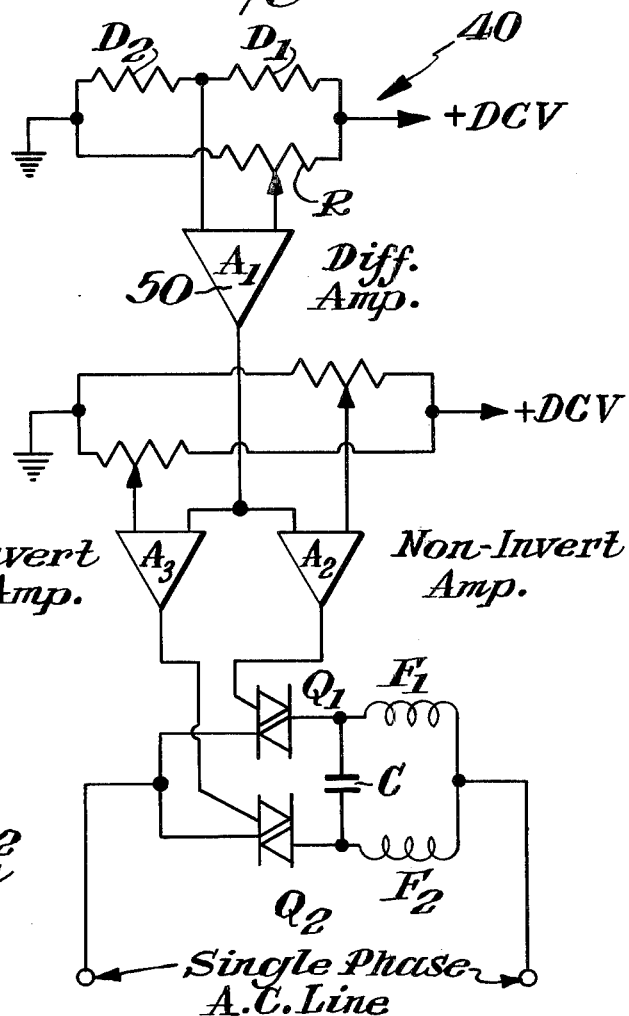
FIG. 8 is a schematic electrical diagrammatic view for the embodiment shown in FIGS. 1–6.
Figure 9:
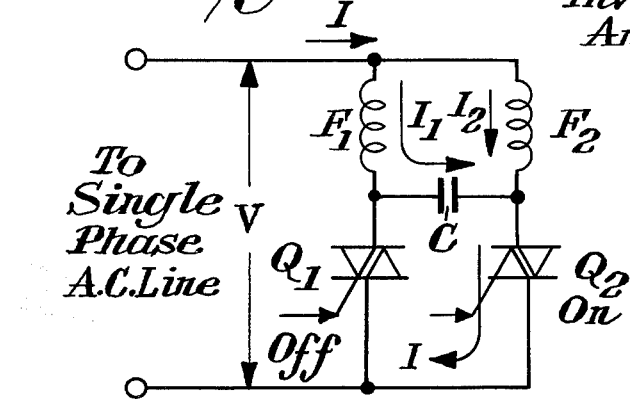
FIG. 9 is a schematic electrical diagram of the field and switching currents embodiment of this invention shown in FIGS. 1–6 and 8.
Figure 10:
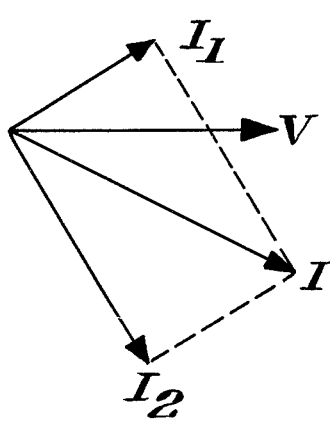
FIG. 10 is a vector diagram for the electrical diagram shown in FIG. 9.
Figure 11:
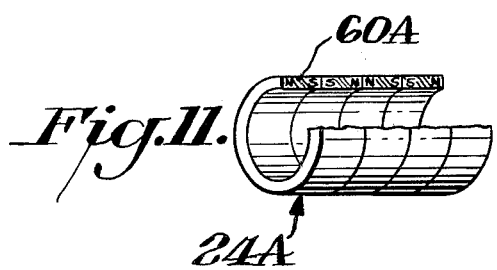
FIG. 11 is a side view in elevation of another form of armature for a modification of the embodiment shown in FIG. 1.
Figure 12:
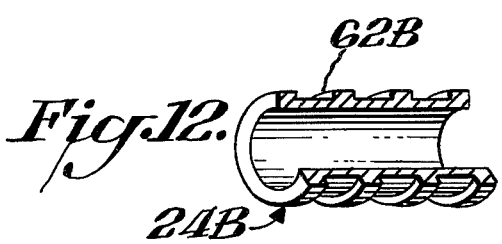
FIG. 12 is still another form of armature for another modification of the embodiment shown in FIG. 1.

FIG. 11 shows an armature 24A of molded ferrite rings 60A providing a permanent magnet armature. FIG. 12 shows an all steel variable reluctance armature with annular slots 62B in its outer periphery to constitute armature 24B. FIG. 7 illustrates a simplified switching arrangement and switching sequence for stepwise movement with either armature 24A and 24B.

Another advantage of the tubular configuration of the above described embodiments results from the rotational symmetry of the field structures. The attractive (and sometimes repulsive) forces exerted diametrically on the armature tend to levitate the armature reducing the sliding friction and improving the operating efficiency.

In applying the tubular linear AC induction motor, for example, to the automatic focusing of projection lens 28, a relative position sensing arrangement 38 and an electronic servo controller 40 (shown in FIG. 8) are required. A variety of means are available to sense relative position. The optical relative position sensing means 38 includes a focused source 42, a pair of photodetectors D1 and D2, a collection lens 43, and the reflecting surface 44 of the slide film 46 to be kept in focus. With source and detector assemblies 42 and 48 both mounted on the projection lens 28, the relative position of the slide 46 to the lens 28 can be determined, an error signal being generated by the detector pair D1 and D2 when the distance separating lens and slide is not equal to some preset value. The resulting error is input to the electronic servo controller 40

(shown in FIG. 8) where it is amplified and used to control power to the field windings.

FIGS. 6–10 show how the relative position sensing system's elements are employed to generate an error signal at the input of differential amplifier $A_1$ when the film plane 44 is displaced from the desired focal position; and how zero error signal is generated when the film plane 44 is at the desired focal distance from the lens 28. The desired focal distance is manually set by adjusting potentiometer R, which establishes a reference voltage at the input of $A_1$. $A_1$ amplifies this error signal and applies its output to the input of the two switching amplifiers $A_2$ and $A_3$. For an output above or below the reference level of the switching amplifiers $A_2$ and $A_3$, one or the other is switched on, thus applying a positive signal to the gate of the appropriate triac solid state AC switch $Q_1$ or $Q_2$. When an error signal is present, only one of the triacs is gated on. Assuming $Q_1$ is gated on, the AC line is connected directly across field coil, $F_1$, supplying current to that coil in phase with the AC line. The other field coil, $F_2$, is connected to the line through capacitor, C, and is therefore supplied current out of phase with the AC line. The armature 24 is thus forced to move in the direction that will return the error signal to zero, at which point, both triacs $Q_1$ and $Q_2$ are held off and no power is supplied to the field coils 16. Relative film displacement in the other direction causes an error signal on the opposite side of the voltage reference input to $A_1$, resulting in the opposite triac being turned on, and a reversed phase relationship between the two field coils to cause armature motion opposite to that just described, returning the error signal to zero. Photoresistors $D_1$ and $D_2$ are depicted in this example. Photodiodes, phototransistors or other transducers sensitive to a relative displacement may also be used. The servo control electronics could also be of various well known designs, including those with rate feedback and other more sophisticated characteristics.

Automatic focusing of the slide is, therefore, essentially in the following manner. It is first assumed that potentiometer R, is adjusted to its mid-point so that half of the voltage of the +DCV source appears at the reference input to amplifier $A_1$. It is also assumed that the photoresistive detectors $D_1$ and $D_2$ are identical (not a required condition). Equal amounts of light must fall therefore on both in order that the voltage at their junction, the other output to the amplifier $A_1$, also equals half the voltage of the +DCV source. Under these conditions, the voltage across the inputs to amplifier $A_1$ is zero, the bridge consisting of $D_1$, $D_2$, and R is in balance, no signal appears at the output of $A_1$, and no output is generated by switching amplifiers $A_2$ and $A_3$. If a warped or "popped" slide 46 is inserted into the projector slide holder 50, the source beam 52 is intercepted and reflected by the slide's surface 44A in a plane closer to or farther from the lens than the "in focus plane" 44—hence the slide will not be sharply focused on the screen by the lens 28. When intercepted at a plane other than the "in focus plane" 44, the source beam 52 is reflected through a different but parallel path from the optimum path to the detector collection lens 43. The action of the collection lens 43 on the displaced reflected beam 54 concentrates the reflected light predominately on one or the other photoresistor $D_1$ or $D_2$ according to the direction the film is displaced from the "in focus plane". In the illustrated example detector $D_1$ receives more light and $D_2$ receives less. The resistance of $D_1$ decreases and $D_2$ increases, raising the voltage level at their junction to a value above ½(+DCV). A voltage difference now appears across the inputs to $A_1$ and an output signal is presented to amplifiers $A_2$ and $A_3$. Taking this output to be below the reference levels input to each of the amplifiers $A_2$ and $A_3$, the inverting amplifier $A_3$ provides an output signal to gate on triac $Q_2$ while $Q_1$ is held off. $A_2$ and $Q_1$ perform in the same manner for $A_1$ outputs above the mentioned reference level. With $Q_2$ gated on, field coil $F_2$ is connected directly across the single phase AC line while field coil $F_1$ is connected across the line through series capacitance C. The resulting phase shift of the energizing electric currents and their magnetic fields is shown in the phasor diagram FIG. 10, for this case. The armature 24 following the traveling magnetic field moves in a direction from field coil $F_1$ toward field coil $F_2$. The lens 28 with its attached light source 42 and detector assembly 48 is moved toward the slide 46, reducing the relative distance between slide 46 and lens system 28, displacing the reflected beam 54 toward the center of the collecting lens 43. Motion of the lens 43 continues until the beam is centered, and voltage at the junction of $D_1$ and $D_2$ returns to a value equal to that appearing at the potentiometer output. To manually refocus lens 28, the pick-off location of the potetiometer R slider is moved to the required location, upsetting bridge balance by applying a different voltage at the reference input to amplifier $A_1$. Lens 28 is forced to move to a new location such that light falling on $D_1$ and $D_2$ is distributed so as to divide the voltage at their junction indentically to that appearing at the potentiometer output. Error signals due to lens-slide distance are now removed by the lens being repositioned to this new location.

The illustrated source of error signal is similar to that shown in U.S. Pat. No. 3,342,102.

Appropriate input to the servo control electronics might also be obtained from various sensor arrangements shown in U.S. Pat. Nos. 3,421,815, 3,264,935 or 2,968,994.

A particularly advantageous application of the linear AC induction motor in automatic focusing of optical systems results from its inherent ability to make large excursions when used to maintain focus on a moving scene. This application is well illustrated where linear induction motor is used in conjunction with the sensor described in U.S. Pat. No. 3,398,665.

The automatic focusing apparatus of this invention has only one moving part and therefore enjoys the reliability characteristics of an electric motor. This compares very favorably with existing automatic focusing systems which usually have ten to fifteen moving parts and are also comparatively delicate and sluggish.

By taking either input to amplifier A, but preferably the reference input, to be a summing point, and connecting to this point the output of an independent signal source such as a sine wave oscillator (ramp, triangle, or other function generator) the projection lens of the described embodiment can be made to oscillate about the optimum focus in the manner prescribed (based upon the selection of the signal source). The lens is thus made to scan the projected in focus image of the slide onto planes axially adjacent to that nominally in focus with the "optimum" object plane; or to scan object planes axially adjacent to that nominally in focus and project those planes in addition to that nominally in focus; or to move appropriate lens elements within a lens system to provide a scan of magnification or demagnification or both; (or to provide a constant magnification under conditions of changing object or image planes). These variations of this invention could be employed to achieve other optical effects such as "scene dissolve" or to provide cues to aid in the visual perception of 3-D (third dimensional) effects; or to move selected lens elements within a lens system in concert with appropriate signal inputs to provide a "zoom" effect.

The description of the preferred embodiment of this invention as well as the possible modifications will suggest that optical elements other than projection lenses may be connected to or made part of the armature of a linear electric motor and thus have their positions accurately controlled, scanned or otherwise moved to perform their respective functions in a manner that accrues all the advantages offered by this motive means. A typical application would, for example, be for repetitively moving a mirror of an optical interfeometer. Another example would be to move a mirror linearly in an optical page reader.

I claim:

1. An automatic component positioning device for an optical assembly having an object comprising a linear electric motor including a cylindrical field winding and a cylindrical armature mounted within said field winding for axial movement relative thereto, said component being connected to said armature to cause said component to be moved by said armature, a position detecting assembly for determining whether said component is disposed at a predetermined position relative to said object, a reversible drive circuit connected to said field winding, said reversible drive circuit having driving conditions and a null condition, a servo circuit connecting said position detecting means to said reversible drive circuit whereby said reversible drive circuit is constituted in said driving condition and said armature is caused to move it toward said null condition when said position detecting assembly determines that said component is not in said predetermined position whereby said component is repositioned at said predetermined position and said reversible drive circuit is reconstituted into said null condition, and said field winding is energized with DC currents switched into it in an appropriate sequence causing said variable reluctance motor to constitute a DC variable reluctance stepping motor.

2. An automatic component positioning device for an optical assembly having an object comprising a linear electric motor including a cylindrical field winding and a cylindrical armature mounted within said field winding for axial movement relative thereto, said component being connected to said armature to cause said component to be moved by said armature, a position detecting assembly for determining whether said component is disposed at a predetermined position relative to said object, a reversible drive circuit connected to said field winding, said reversible drive circuit having driving conditions and a null condition, a servo circuit connecting said position detecting means to said reversible drive circuit whereby said reversible drive circuit is constituted in said driving condition and said armature is caused to move it toward said null condition when said position detecting assembly determines that said component is not in said predetermined position whereby said component is repositioned at said predetermined position and said reversible drive circuit is reconstituted into said null condition, the field winding is energized with DC currents switched into it in an appropriate sequence and of proper polarity, and said armature comprises a stack of permanent magnet rings arranged so as to produce alternating north and south magnetic poles along the length of said armature whereby said linear motor comprises a DC permanent magnet stepping motor.

3. An automatic component positioning device for an optical assembly having an object comprising a linear electric motor including a cylindrical field winding and a cylindrical armature mounted within said field winding for axial movement relative thereto, said component being connected to said armature to cause said component to be moved by said armature, a position detecting assembly for determining whether said component is disposed at a predetermined position relative to said object, a reversible drive circuit connected to said field winding, said reversible drive circuit having driving conditions and a null condition, a servo circuit connecting said position detecting means to said reversible drive circuit whereby said reversible drive circuit is constituted in said driving condition and said armature is caused to move it toward said null condition when said position detecting assembly determines that said component is not in said predetermined position whereby said component is repositioned at said predetermined position and said reversible drive circuit is reconstituted into said null condition, said cylindrical field winding is mounted within a bobbin structure of substantially insulating material, said bobbin structure comprises a number of axially aligned bobbins of insulating material, and said bobbins being spaced from each other by and having disposed at their ends ferromagnetic annular disc-shaped pole pieces.

4. An automatic component positioning device as set forth in claim 3, wherein said servo circuit comprises a servo amplifier.

5. An automatic component positioning device as set forth in claim 3, wherein said reversible drive circuit comprises a semiconductor bridge network.

6. An automatic component positioning device as set forth in claim 5, wherein said semiconductor bridge network comprises triac switching elements.

7. An automatic component positioning device as set forth in claim 3, wherein said linear electric motor is a linear AC induction motor.

8. An automatic component positioning device as set forth in claim 3, wherein said positioning detecting assembly comprises light source, reflecting and detecting assemblies.

9. An automatic component positioning device as set forth in claim 3, wherein a signal inserting circuit is connected to said servo circuit for providing a null position of said armature whereabout said component may be moved in a scanning manner.

10. An automatic component positioning device as set forth in claim 3, wherein said armature comprises a slotted steel cylinder whereby said linear motor comprises an AC variable reluctance motor having field coils and in which the field coils are energized with an AC current which is phase shifted in juxtaposed coils.

11. An automatic component positioning device as set forth in claim 3, wherein said linear electric motor is an AC induction motor and said armature comprises a component supporting tube having a thin conductive outer layer.

12. An automatic component positioning device as set forth in claim 3, wherein ferromagnetic yoke pieces are annularly disposed between said pole pieces and surrounding said field windings in said bobbins.

13. An automatic component positioning device as set forth in claim 3, wherein said bobbins comprise flanged cylindrical bobbin rings having said windings wound around their outer surfaces and between their flanges and having unobstructed inside surfaces, said unobstructed inside surfaces being disposed closely adjacent said armature for defining with said armature an air gap between said pole pieces and said armature, and said rings comprising an insulating material having substantially effective mechanical lubricating properties in conjunction with said armature.

14. An automatic component positioning device as set forth in claim 3, wherein said optical component is an optical lens assembly.

15. An automatic component positioning device as set forth in claim 14, wherein said optical lens assembly is a projection lens assembly for projecting an image of a transparency and said position detecting assembly being constructed and arranged for detecting the relative positions of said component and said transparency.

16. An automatic component positioning device as set forth in claim 3 wherein the field winding has two or more independent coils.

17. An automatic component positioning device as set forth in claim 3 wherein the armature is free of electrical and mechanical connection to any stationary component whereby its movement is facilitated.

* * * * *